US011962102B2

(12) United States Patent
Patton et al.

(10) Patent No.: US 11,962,102 B2
(45) Date of Patent: Apr. 16, 2024

(54) MULTI-BAND STAMPED SHEET METAL ANTENNA

(71) Applicant: Neptune Technology Group Inc., Tallassee, AL (US)

(72) Inventors: Damon Lloyd Patton, Wetumpka, AL (US); James Michael Beam, Montgomery, AL (US)

(73) Assignee: Neptune Technology Group Inc., Tallassee, AL (US)

( * ) Notice: Subject to any disclaimer, the term of this patent is extended or adjusted under 35 U.S.C. 154(b) by 52 days.

(21) Appl. No.: 17/746,470

(22) Filed: May 17, 2022

(65) Prior Publication Data

US 2022/0416430 A1 Dec. 29, 2022

Related U.S. Application Data

(60) Provisional application No. 63/211,606, filed on Jun. 17, 2021.

(51) Int. Cl.

*H01Q 5/371* (2015.01)
*H01Q 9/28* (2006.01)
*H01Q 9/44* (2006.01)
*H01Q 1/22* (2006.01)

(52) U.S. Cl.

CPC ............... *H01Q 9/44* (2013.01); *H01Q 5/371* (2015.01); *H01Q 9/28* (2013.01); *H01Q 1/2233* (2013.01)

(58) Field of Classification Search

CPC ........ H01Q 5/378; H01Q 5/385; H01Q 5/392; H01Q 9/16; H01Q 9/18; H01Q 9/26; H01Q 9/265; H01Q 9/28; H01Q 9/285; H01Q 9/44

See application file for complete search history.

(56) References Cited

U.S. PATENT DOCUMENTS 5,559,523 A 9/1996 Smith et al.
6,046,704 A 4/2000 Lopez
6,326,920 B1 12/2001 Barnett et al.
6,348,898 B1 2/2002 Rosenbury et al.
6,429,818 B1 8/2002 Johnson et al.
6,456,249 B1 9/2002 Johnson et al.
6,486,836 B1 11/2002 Hill
6,614,399 B2 9/2003 Trumbull et al.
6,621,465 B2 9/2003 Teillet et al.
6,697,029 B2 2/2004 Teillet et al.

(Continued)

FOREIGN PATENT DOCUMENTS

CA 2335671 A1 9/2001
CN 103503231 A * 1/2014 ............. H01Q 1/246

(Continued)

*Primary Examiner* — Daniel Munoz
(74) *Attorney, Agent, or Firm* — Snyder, Clark, Lesch & Chung, LLP

(57) ABSTRACT

A dipole antenna structure that includes a sheet of metal that forms elements of a dipole antenna. The sheet of metal includes a first arm, and a second arm connected to the first arm, and formed substantially co-planar with, and non-parallel to, the first arm. The sheet of metal further includes at least one impedance matching element connected to the first arm and the second arm, where the at least one impedance matching element is formed in the sheet of metal at an angle relative to a plane that coincides with the substantially co-planar first and second arms.

20 Claims, 13 Drawing Sheets

(56) References Cited

U.S. PATENT DOCUMENTS

| | | | |
|---|---|---|---|
| 6,717,555 | B2 | 4/2004 | Teillet et al. |
| 6,734,825 | B1 | 5/2004 | Guo et al. |
| 6,791,506 | B2 | 9/2004 | Suganthan et al. |
| 6,914,564 | B2 | 7/2005 | Barras et al. |
| 7,075,497 | B2 | 7/2006 | Teillet et al. |
| 7,126,543 | B2 | 10/2006 | Tang et al. |
| 7,224,313 | B2 | 5/2007 | Mckinzie, III et al. |
| 7,242,352 | B2 | 7/2007 | Tavassoli |
| 7,242,364 | B2 | 7/2007 | Ranta |
| 7,363,058 | B2 | 4/2008 | Gustaf |
| 7,446,717 | B2 | 11/2008 | Hung et al. |
| 7,466,275 | B2 | 12/2008 | Cheng |
| 7,492,318 | B2 | 2/2009 | Duzdar et al. |
| 7,522,110 | B2 | 4/2009 | Wu |
| 7,589,682 | B1 | 9/2009 | Wu et al. |
| 7,659,859 | B2 | 2/2010 | Bisiules et al. |
| 7,764,233 | B2 | 7/2010 | Wu |
| 7,768,471 | B2 | 8/2010 | Su et al. |
| 7,932,865 | B2 | 4/2011 | Wong et al. |
| 7,986,274 | B2 | 7/2011 | Yang et al. |
| 8,406,825 | B2 | 3/2013 | Huang |
| 8,570,233 | B2 | 10/2013 | Lindmark et al. |
| 8,587,486 | B2 | 11/2013 | Chiu et al. |
| 8,604,981 | B2 | 12/2013 | Ehlen |
| 8,665,170 | B2 | 3/2014 | Bishop et al. |
| 8,928,538 | B2 | 1/2015 | Montgomery et al. |
| 8,994,594 | B1 | 3/2015 | Wilson |
| 9,136,603 | B2 | 9/2015 | Sim et al. |
| 9,225,053 | B2 | 12/2015 | Hung et al. |
| 9,385,433 | B2 | 7/2016 | Stoytchev |
| 9,705,205 | B2 | 7/2017 | Liu et al. |
| 9,837,722 | B2 | 12/2017 | Minard et al. |
| 9,865,915 | B2 | 1/2018 | Shiu et al. |
| 10,063,108 | B1 | 8/2018 | Hosseini |
| 10,074,909 | B2 | 9/2018 | Su et al. |
| 10,826,182 | B2 | 11/2020 | Kyllonen |
| 2002/0070902 | A1 | 6/2002 | Johnson et al. |
| 2002/0080078 | A1 | 6/2002 | Trumbull et al. |
| 2002/0135527 | A1 | 9/2002 | Teillet et al. |
| 2002/0135528 | A1 | 9/2002 | Teillet et al. |
| 2004/0080464 | A1 | 4/2004 | Suganthan et al. |
| 2004/0155818 | A1 | 8/2004 | Barras et al. |
| 2004/0263392 | A1 | 12/2004 | Bisiules et al. |
| 2004/0263410 | A1 | 12/2004 | Teillet et al. |
| 2005/0001777 | A1 | 1/2005 | Suganthan et al. |
| 2005/0024268 | A1 | 2/2005 | Mckinzie, III et al. |
| 2005/0104788 | A1 | 5/2005 | Hung et al. |
| 2006/0176233 | A1 | 8/2006 | Tang et al. |
| 2006/0232490 | A1 | 10/2006 | Bisiules et al. |
| 2007/0100385 | A1 | 5/2007 | Rawat et al. |
| 2007/0132646 | A1 | 6/2007 | Hung et al. |
| 2008/0081658 | A1 | 4/2008 | Cheng |
| 2008/0198077 | A1 | 8/2008 | Duzdar et al. |
| 2008/0266180 | A1 | 10/2008 | Wu |
| 2008/0266189 | A1 | 10/2008 | Wu |
| 2008/0309570 | A1 | 12/2008 | Wu |
| 2009/0102738 | A1 | 4/2009 | Bonczyk |
| 2009/0128439 | A1 | 5/2009 | Su et al. |
| 2009/0146888 | A1 | 6/2009 | Wu |
| 2009/0167610 | A1 | 7/2009 | Chen et al. |
| 2009/0237311 | A1 | 9/2009 | Wu et al. |
| 2009/0273521 | A1 | 11/2009 | Wong et al. |
| 2010/0225551 | A1 | 9/2010 | Yang et al. |
| 2011/0028191 | A1 | 2/2011 | Huang et al. |
| 2011/0037680 | A1 | 2/2011 | Chiu et al. |
| 2011/0122035 | A1 | 5/2011 | Montgomery et al. |
| 2012/0075155 | A1 | 3/2012 | Lindmark et al. |
| 2012/0293376 | A1 | 11/2012 | Hung |
| 2013/0182880 | A1 | 7/2013 | Huang et al. |
| 2014/0210680 | A1 | 7/2014 | Stoytchev |
| 2015/0102971 | A1 | 4/2015 | Liu et al. |
| 2016/0365640 | A1 | 12/2016 | Minard et al. |
| 2017/0025766 | A1 | 1/2017 | Su et al. |
| 2019/0273323 | A1 | 9/2019 | Kyllonen |
| 2019/0296441 | A1 | 9/2019 | Cao et al. |
| 2019/0334242 | A1 | 10/2019 | Wilson |
| 2020/0044320 | A1 | 2/2020 | Han et al. |
| 2020/0106195 | A1 | 4/2020 | Fleancu et al. |
| 2020/0136258 | A1 | 4/2020 | Patton et al. |
| 2023/0114125 | A1 * | 4/2023 | Kenkel ................ H01Q 1/2291 343/700 MS |

FOREIGN PATENT DOCUMENTS

| | | | |
|---|---|---|---|
| CN | 206564327 U | * | 10/2017 |
| EP | 2028720 A1 | | 2/2009 |

* cited by examiner

MULTI-BAND STAMPED SHEET METAL ANTENNA

CROSS-REFERENCE TO RELATED APPLICATION

This application claims priority under 35 U.S.C. § 119, based on U.S. Provisional Application No. 63/211,606, filed Jun. 17, 2021, the disclosure of which is incorporated by reference herein.

BACKGROUND

Dipole antennas are commonly used for wireless communications. A dipole antenna typically includes two identical conductive elements to which a driving current from a transmitter is applied, or from which a received wireless signal is applied to a receiver. A dipole antenna most commonly includes two conductors of equal length oriented end-to-end with a feedline connected between them. The most commonly used dipole antenna is the half-wave dipole that includes two quarter-wavelength conductors placed end to end for a total length (L) of approximately $L=\lambda/2$, where $\lambda$, is the wavelength corresponding to the intended frequency (f) of operation. A dipole antenna's radiation pattern is typically omnidirectional in a plane perpendicular to the wire axis, with the radiation falling to zero off the ends of the antenna.

DETAILED DESCRIPTION OF EXAMPLE EMBODIMENTS

Figure 1A:
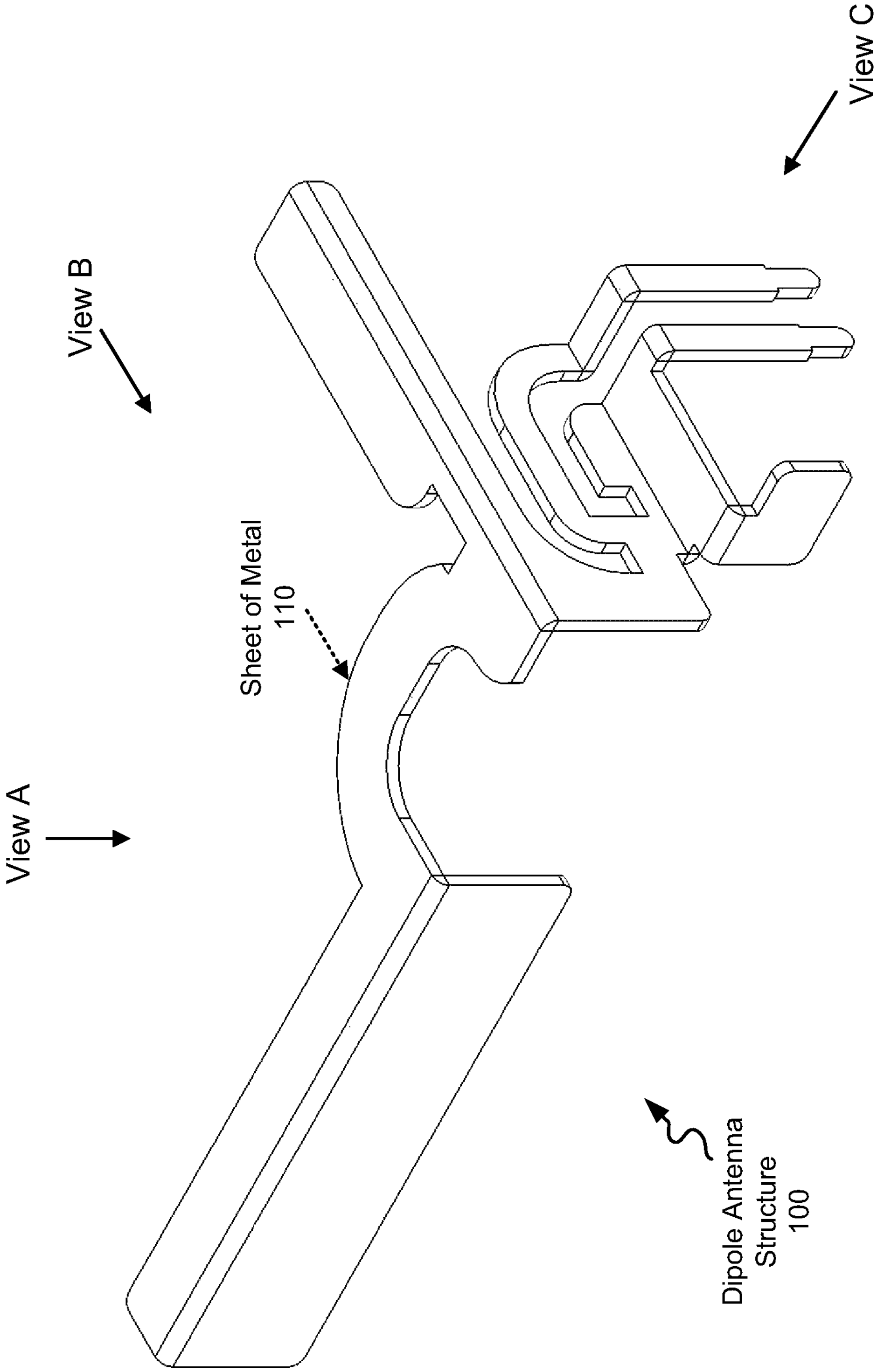
FIGS. 1A and 1B depict different three-dimensional views of a dipole antenna structure according to an exemplary implementation.

The following detailed description refers to the accompanying drawings. The same reference numbers in different drawings may identify the same or similar elements. The following detailed description does not limit the invention.

As described herein, a multi-band dipole antenna structure may be formed from a sheet of metal (e.g., a single sheet of stamped metal) that may include multiple arms. In one implementation, the multiple arms may include two dipole arms formed non-parallel to, and co-planar with, one another and connected to a cantilever beam that cantilevers the two dipole arms out and away from an underlying PCB to which the antenna is connected. The two dipole arms may be formed at an angle ⊖ relative one another, where the angle ⊖ falls within the range 0>⊖>180 degrees. The sheet of metal of the dipole antenna structure may further include a feed connection, a ground connection, and one or more antenna impedance matching elements that either directly or indirectly connect to the two dipole arms. Since, in some implementations, the antenna impedance matching elements can be embedded in the sheet metal structure of the dipole antenna, no discrete matching components may need to be disposed on the PCB, thus, reducing the size and cost of the PCB. The at least two arms of the dipole antenna facilitate multi-band tuning, where the shape and size of a first arm can be "tuned" to set a lower frequency band of the antenna, and the shape and size of a second arm can be "tuned" to set a higher frequency band of the antenna. Thus, as described further below, the first arm may be tuned to cause the antenna to resonate at a first, lower frequency band, and the second arm may be tuned to cause the antenna to resonate at a second, higher frequency band.

A portion of the antenna structure's sheet metal, that may include the antenna impedance matching elements, may be formed as a cantilevered structure that cantilevers the arms of the dipole antenna out and away from the underlying PCB to which the antenna structure is connected. The cantilevered structure of the dipole antenna structure enables the lower portion of the antenna structure to be submerged or formed within a layer of PCB potting compound (e.g., epoxy, resin, polyurethane, silicone) to protect the underlying PCB and to provide additional mechanical support to the dipole antenna structure, while at the same time permitting the antenna's dipole arms to extend above the layer of PCB potting compound so as to minimize the effect of the PCB potting upon the frequency response of the dipole antenna.

The dipole antenna structure described herein may be used in, for example, a meter such as a utility meter (e.g., a water meter or power usage meter) to transmit and receive data (e.g., meter readings, requests for meter readings, etc.). For example, the antenna structure may be a component of a meter interface unit within the utility meter that enables wireless communication to/from the utility meter in multiple different frequency bands (e.g., Long-Term Evolution (LTE) bands, Industrial, Scientific, and Medical (ISM) bands, or Bluetooth™ bands). The compact nature of the dipole antenna structure, requiring the use of no external, discrete impedance matching components (e.g., no impedance matching components disposed on an external PCB), enables the antenna to be fit within the physical constraints of existing meter interface units, and/or more easily fit within newly designed meter interface units that may be relatively small in size.

Figure 1B:
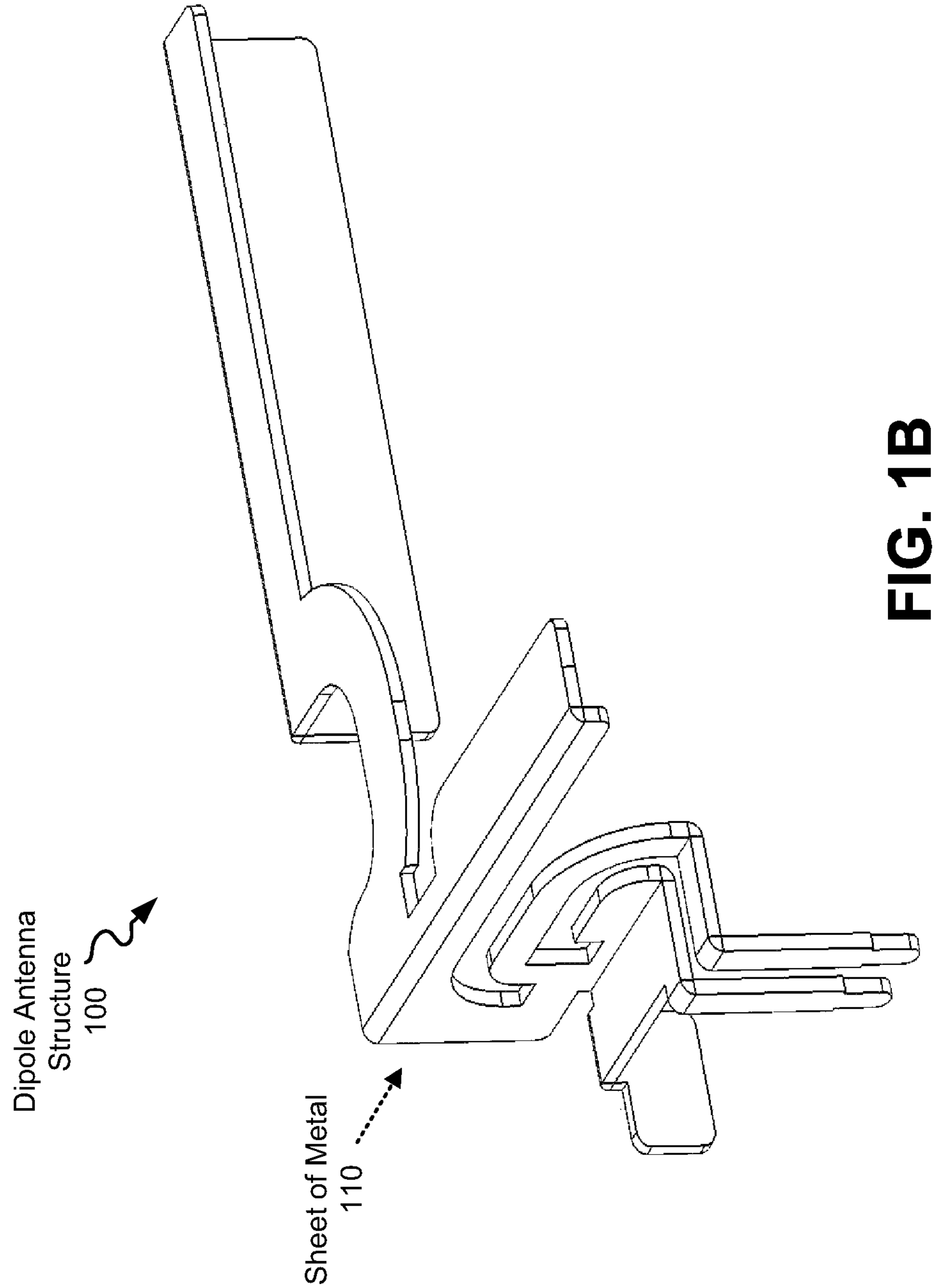

FIGS. 1A and 1B depict different three-dimensional views of a dipole antenna structure 100 according to an exemplary implementation. As shown, the dipole antenna structure 100 is formed from a sheet of metal 110 that, in one implementation, may be stamped into the shape depicted in FIGS. 1A and 1B. The dipole antenna structure 100 is shown in FIGS. 1A and 1B as including a single sheet of metal 110 that forms one or more elements of an overall antenna. In an implementation described herein, the sheet of metal 110 may form multiple radiating elements (i.e., multiple dipole arms) and may possibly form one or more other elements of the overall antenna, such as, for example, an impedance matching element, a feed connection element, and/or a ground connection element. Other elements of the overall antenna may also be formed in sheet metal 110, and/or may be disposed on the PCB to which the dipole antenna structure 100 connects. Therefore, the overall antenna described herein may include dipole antenna structure 100, formed from sheet metal 110 as shown in FIGS. 1A and 1B, and may additionally include other antenna elements that are disposed on the PCB. The entirety of the antenna, thus, may include the dipole antenna structure 100 and the PCB. The sheet of metal 110 used to form the dipole antenna structure 100 may have a uniform thickness ranging from 0.7 mm to 1.0 mm. In one implementation, the sheet of metal 110 may have a uniform thickness of 0.85 mm. Alternatively, the sheet of metal 100 may be formed in the shape of the dipole antenna 100, shown in FIGS. 1A and 1B, using a forging technique, or other metal working technique. The sheet of metal 110 may be formed from one or more types of metal and/or metal alloys, such as, for example, copper or aluminum.

Figure 2:
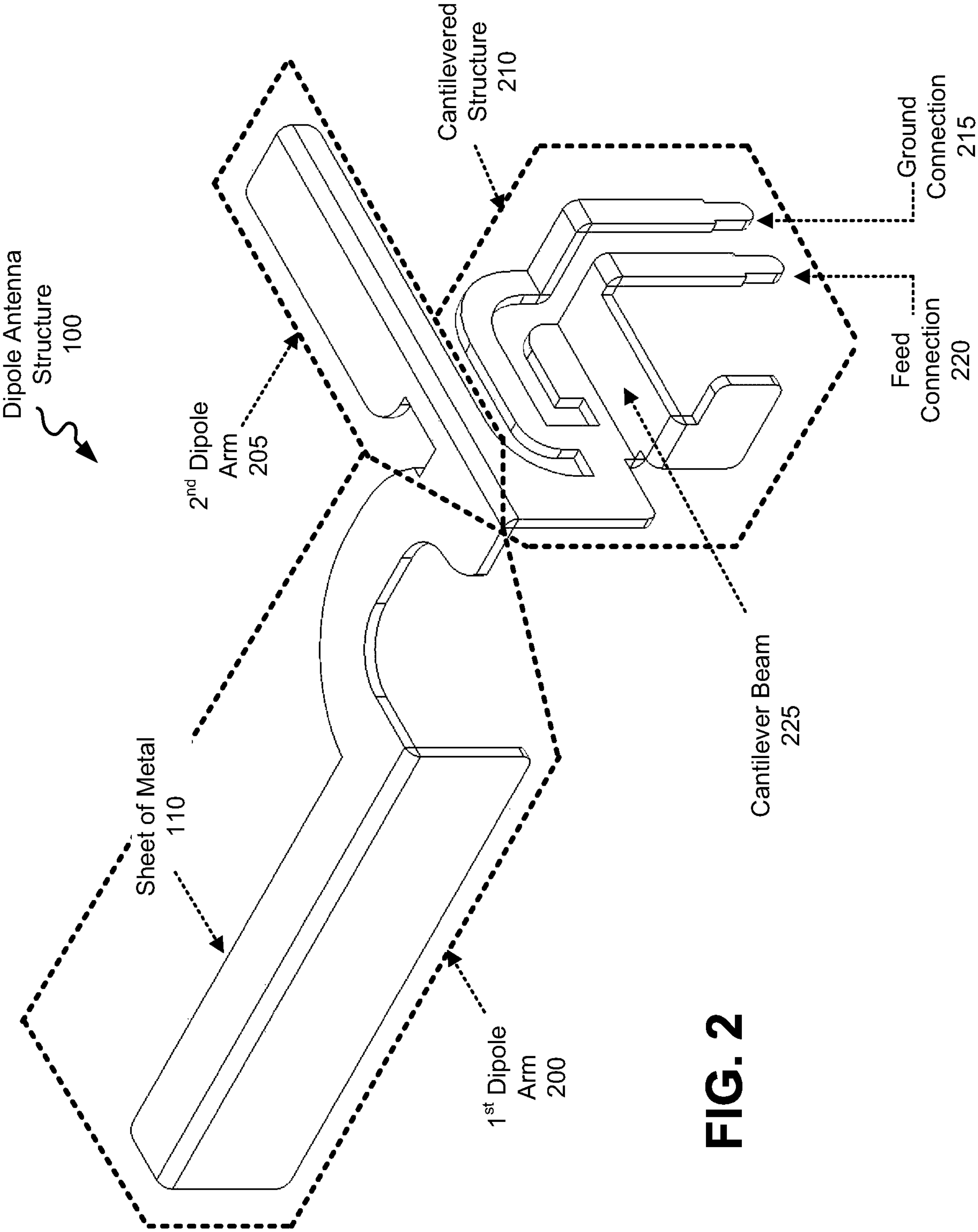
FIG. 2 illustrates components of the dipole antenna structure of the exemplary implementation of FIGS. 1A and 1B.

FIG. 2 illustrates components of the dipole antenna structure 100 of the exemplary implementation of FIGS. 1A and 1B. As shown, dipole antenna structure 100 may include a first dipole arm 200, a second dipole arm 205, and a cantilevered structure 210 that includes, among other components, a ground connection 215 and a feed connection 220. The first dipole arm 200 may be formed non-parallel to, and co-planar with, the second dipole arm 205 from the sheet of metal 110. The cantilevered structure 210 of the dipole antenna structure 100 extends downwards from the portion of the sheet metal that includes the first dipole arm 200 and the second dipole arm 205. The cantilevered structure 210 includes a cantilever beam or surface 225 that serves to cantilever the first dipole arm 200 and the second dipole arm 205 away from the underlying PCB (not shown) to which the dipole antenna structure 100 is connected. Further details of the shapes and sizes of the components of the dipole antenna structure 100 are described below with respect to 4A-4C.

Figure 3:
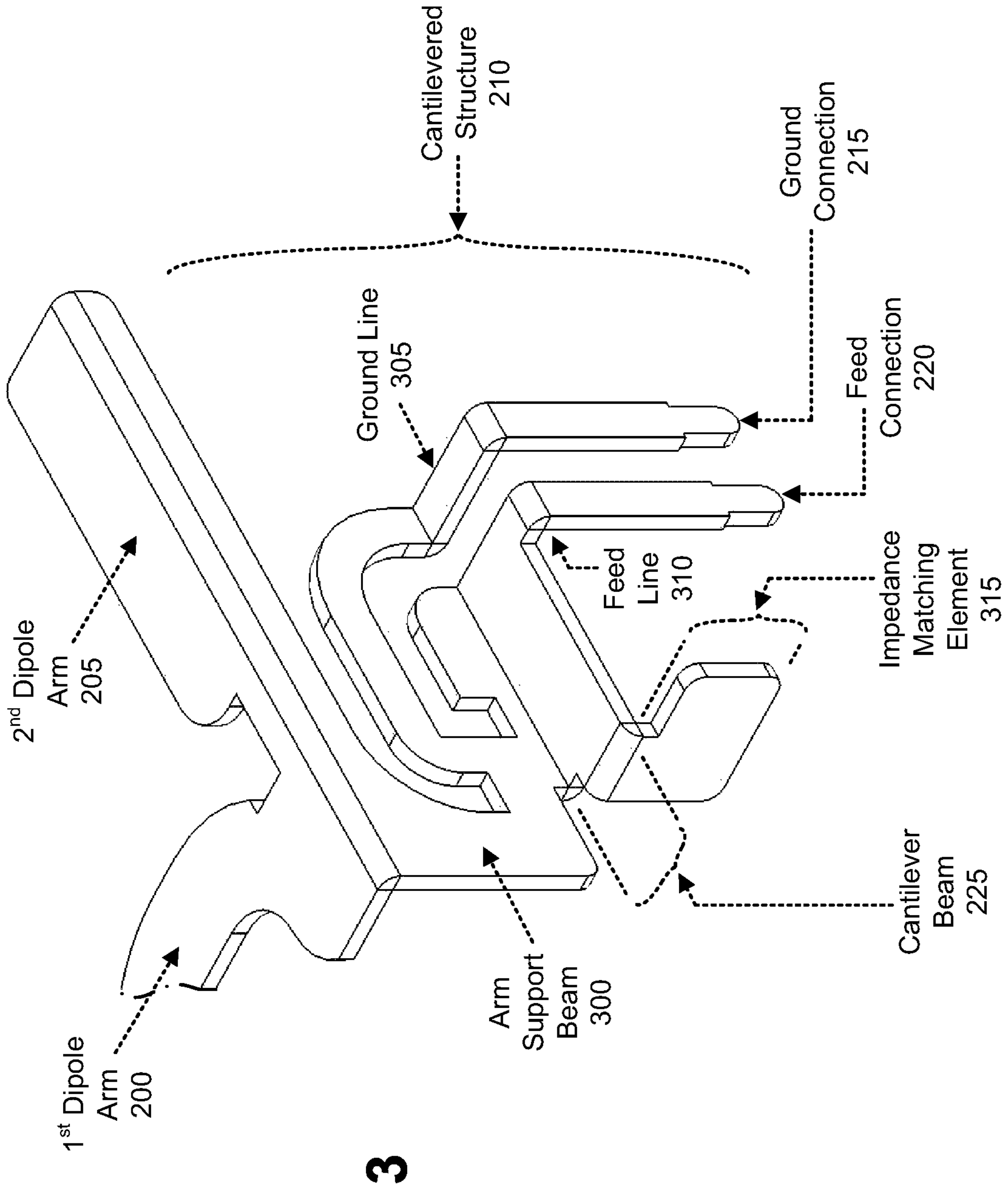
FIG. 3 shows components of the cantilevered structure of the dipole antenna structure of FIGS. 1A and 1B.

FIG. 3 shows components of the cantilevered structure 210 of the dipole antenna structure 100, and the cantilevered structure 210's interconnection with the antenna's dipole arms 200 and 205. The cantilevered structure 210 may include antenna impedance matching elements that enable antenna impedance matching, but also provide cantilevered structural support for the dipole arms 200 and 205. As shown, cantilevered structure 210 includes a vertical arm support beam 300 having a first end that connects to first dipole arm 200 and second dipole arm 205 and a second end that connects to an underlying cantilever beam 225. Cantilever beam 225 extends approximately perpendicularly out from arm support beam 300 (e.g., at a right angle to support beam 300) to create cantilevered structural support for the dipole arms 200 and 205. Cantilever beam 225 further connects to ground connection 215 (via ground line 305) and feed connection 220 (via feed line 310) which, when attached to the PCB (e.g., soldered into the PCB), serve to hold and support the entire dipole antenna 100 in a vertical position.

Ground connection 215 connects to ground line 305, which further forms a circuitous electrical pathway between ground connection 215 and a connection to arm support beam 300 and cantilever beam 225. Feed connection 220 connects to feed line 310, which electrically connects to the cantilever beam 225 and to arm support beam 300. An impedance matching element 315 connects to an outer edge of the cantilever beam 225. A size and shape of impedance matching element 315 may be adjusted to tune the impedance of the dipole antenna 100. Additionally, or alternatively, the size and shape of cantilever beam 225, arm support beam 300, ground line 305, and feed line 310 may also be adjusted to tune the impedance of the dipole antenna structure 100. Other components may also be adjusted to tune the impedance of the dipole antenna structure 100, including modifying the dimensions of first dipole arm 200 and second dipole arm 205 and modifying placement of the dipole antenna structure 100 on the PCB board to which it connects.

Figure 4A:
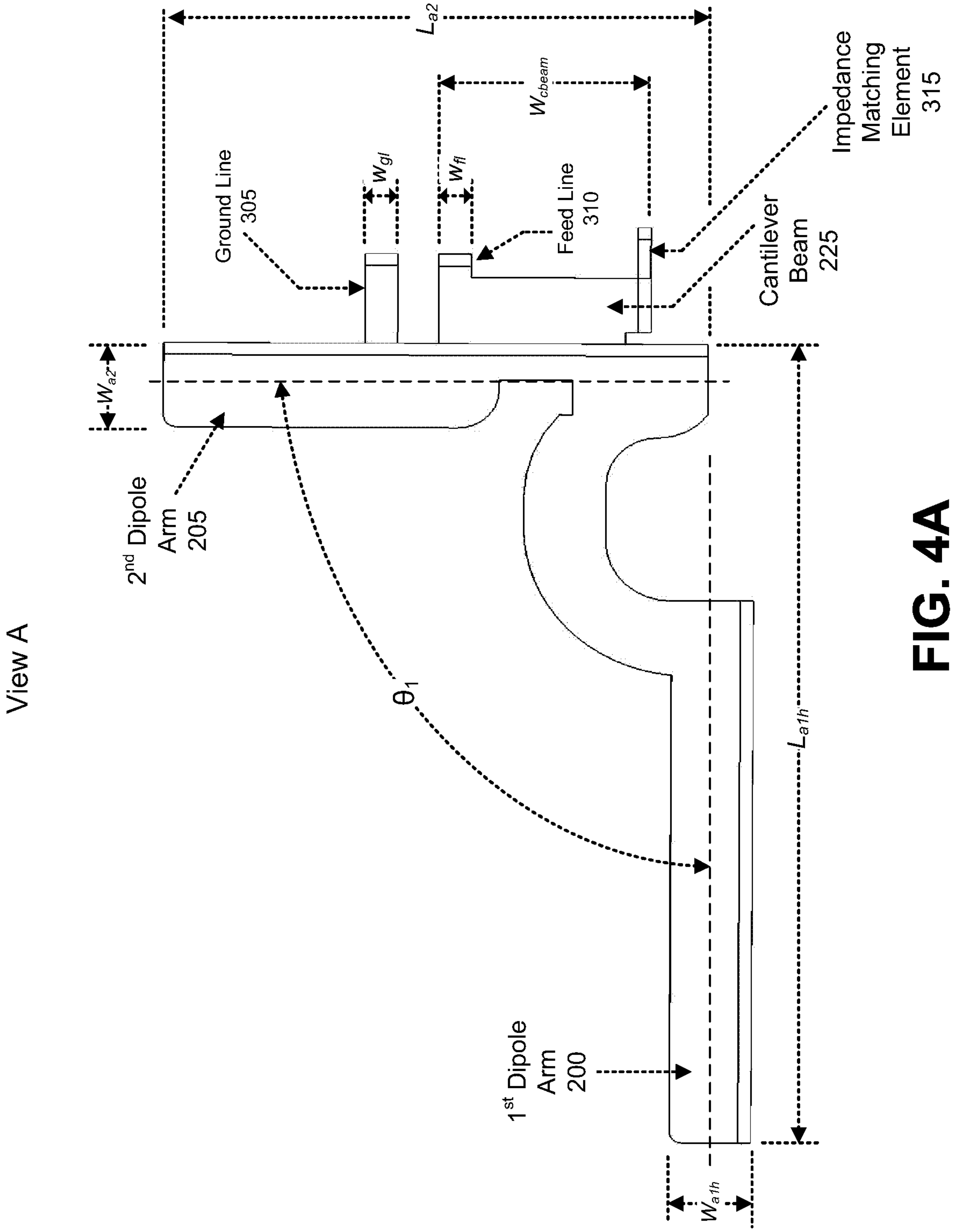
FIGS. 4A-4C illustrate views of an example of the dipole antenna structure that show dimensions associated with, and relative angles between surfaces of, the various structures of the dipole antenna structure formed in the metal sheet.
Figure 4B:
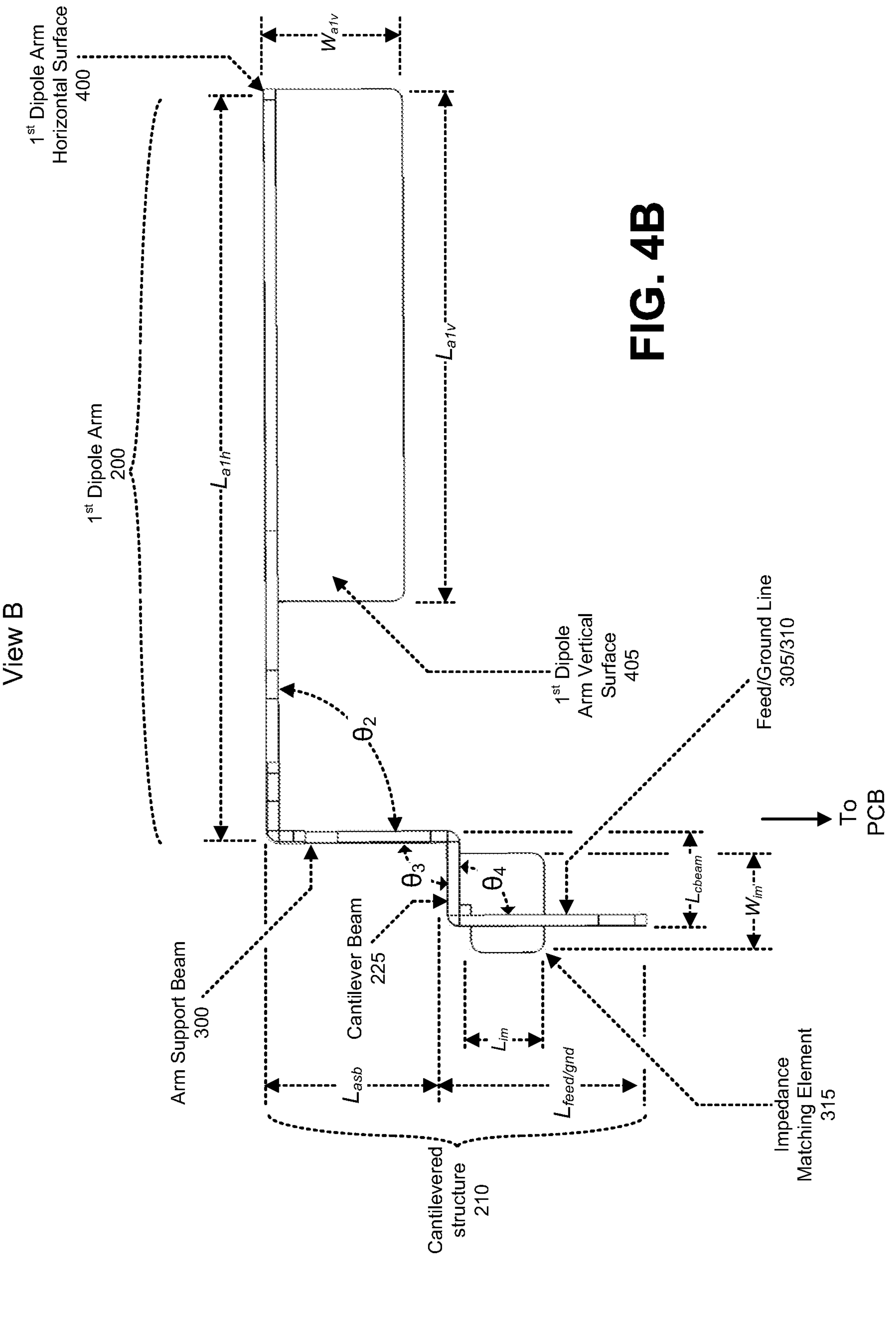
Figure 4C:
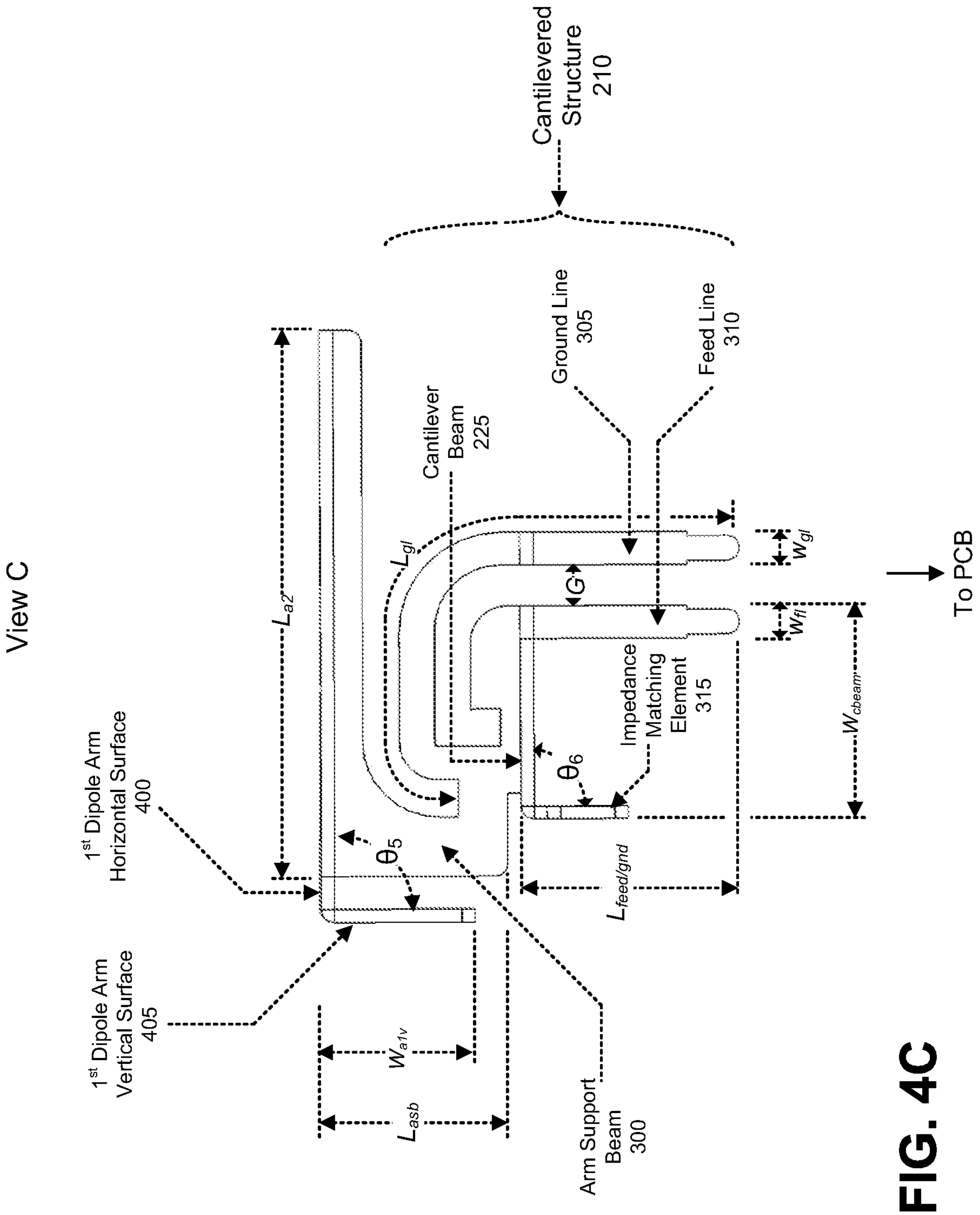

FIGS. 4A-4C illustrate views of an example of dipole antenna structure 100 that show dimensions associated with, and relative angles between surfaces of, the various structures/components of the dipole antenna structure 100 formed in the metal sheet 110. FIG. 4A shows a two-dimensional perspective of dipole antenna structure 100 that corresponds to "View A" indicated in FIG. 1A, FIG. 4B shows a two-dimensional perspective of dipole antenna structure 100 that corresponds to "View B" indicated in FIG. 1A, and FIG. 4C shows a two-dimensional perspective of dipole antenna structure 100 that corresponds to "View C" indicated in FIG. 1A.

The first dipole arm 200 (FIG. 4A) may be formed in the sheet of metal 110 co-planar with the second dipole arm 205. The first dipole arm 200 may be formed non-parallel to the second dipole arm 205, with an angle ⊖1 (FIG. 4A) formed between a first line that extends through a substantial length of first dipole arm 200 and a second line that extends through a substantial length of second dipole arm 205. The first line through first dipole arm 200 is parallel to linear edges of the upper surface of arm 200, and the second line through second dipole arm 205 is parallel to linear edges of the upper surface of arm 205. In the exemplary implementation shown, $\Theta_1$ is equal to 90 degrees. However, in other implementations, $\Theta_1$ may range from greater than 0 degrees to less than 180 degrees ($0<\Theta_1<180$). $\Theta_1$, thus, may be an acute angle, a right angle, or an obtuse angle.

The first dipole arm 200 may be formed in a "dogleg" configuration, having a horizontal surface 400 (FIG. 4B) and a vertical surface 405 (FIG. 4B) that is formed at the outer edge of horizontal surface 400 of arm 200 and which extends downwards at an angle ⊖5 (FIG. 4C) relative to horizontal surface 400. This "dogleg" configuration increases the overall size of first dipole arm 200, while at the same time "folding" the vertical surface 405 downwards to add mechanical rigidity to first dipole arm 200 and to better fit arm 200 within spatial constraints of the device housing within which the dipole antenna structure 100 is to be placed. The horizontal surface 400 of first dipole arm 200 may have a length $L_{a1h}$ (FIG. 4A) that ranges from 53.9 mm to 54.5 mm, and a horizontal surface width $W_{a1h}$ (FIG. 4A) that ranges from 4.7 mm to 5.3 mm. The vertical surface 405 of first dipole arm 200 may have a length $L_{a1v}$ (FIG. 4B) that ranges from 36.5 mm to 37.1 mm and a vertical surface width $W_{a1v}$ (FIG. 4B) that ranges from 8.9 mm to 9.5 mm. In one exemplary implementation, length $L_{a1h}$ may be 54.2 mm, width $W_{a1h}$ may be 5.0 mm, length $L_{a1v}$ may be 36.8 mm, and width $W_{a1v}$ may be 9.2 mm. The angle ⊖5 (FIG. 4C) formed between vertical surface 405 and horizontal surface 400 of dipole arm 200 may range from about 89 degrees to about 91 degrees. In the implementation depicted in FIGS. 4A-4C, angle $\Theta_5$ may be 90 degrees.

The second dipole arm 205 may have a length $L_{a2}$ (FIG. 4A) that ranges from 33.2 mm to 33.8 mm, and a width $W_{a2}$ (FIG. 4A) of an upper surface that ranges from 5.4 mm to 6.0 mm. In one exemplary implementation, the second dipole arm 205 may have a length $L_{a2}$ of 33.5 mm, and a width $W_{a2}$ of the upper surface of 5.7 mm. The tuning of the frequency response of antenna structure 100 may include first adjusting the length $L_{a1h}$ of dipole arm 200, which is relatively tolerant to dimensional changes as compared to arm 205, followed by adjusting the length $L_{a2}$ of dipole arm 205. Small dimensional adjustments of length $L_{a1h}$ of arm 200 and length $L_{a2}$ of arm 205 may then iteratively be made until a balanced solution, that includes a frequency response having the desired frequency bands, is achieved.

Cantilevered structure 210 (FIG. 4B) of dipole antenna structure 100 serves to provide cantilevered structural support for dipole arms 200 and 205. Cantilevered structure 210 includes an arm support beam 300 (FIG. 4B) that connects to dipole arms 200 and 205 at one end of beam 300, and connects to a cantilever beam 225 at another end of beam 300. Cantilever beam 225 further connects to feed line 310 and ground line 305 (FIG. 4B), which themselves connect to the underlying PCB (e.g., with a soldered connection to the PCB—not shown). The weight of dipole arms 200 and 205 is, therefore, supported by arm support beam 300, cantilever beam 225, feed/ground lines 305/310, and the mechanical connection with the PCB (not shown). A planar surface of dipole arm 200 may be formed in the sheet of metal 110 at an angle $\Theta_2$ (FIG. 4B) with a vertical planar surface of arm support beam 300. Angle Θ2 may range from about 89 degrees to about 91 degrees. In the implementation depicted in FIGS. 4A-4C, angle $\Theta_2$ may be 90 degrees. Arm support beam 300 may extend from an underside of second dipole arm 205 for a length $L_{asb}$ (FIG. 4B) down to cantilever beam 225. A planar surface of cantilever beam 225 may be formed in the sheet of metal 110 at an angle Θ3 with the planar outer surface of arm support beam 300. Angle $\Theta_3$ may range from about 89 degrees to about 91 degrees. In the implementation depicted in FIGS. 4A-4C, angle $\Theta_3$ may be 90 degrees. Cantilever beam 225 may extend out a length $L_{cbeam}$, from the lower end of arm support beam 300, where length $L_{cbeam}$ may range from 6.55 mm to 7.15 mm. In the implementation depicted in FIGS. 4A-4C, $L_{cbeam}$ may be 6.85 mm.

Feed line 310 may be formed in the sheet of metal 110 at an angle $\Theta_4$ (FIG. 4B) with the underside of the planar surface of cantilever beam 225. Angle $\Theta_4$ may range from about 89 degrees to about 91 degrees. In the implementation depicted in FIGS. 4A-4C, angle $\Theta_4$ may be 90 degrees. Feed line 310 may have a width $w_{fl}$ (FIG. 4C) and may extend a length $L_{feed/gnd}$ from an upper side of, on an outer edge of, cantilever beam 225. $L_{feed/gnd}$ may range from 12.9 mm to 13.5 mm, and $w_{fl}$ may range from 1.7 mm to 2.3 mm. In the implementation depicted in FIGS. 4A-4C, $L_{feed/gnd}$ may be 13.2 mm and $w_{fl}$ may be 2.0 mm. Ground line 305 may be spaced a consistent gap of G (FIG. 4C) from feed line 310, where G may range from 2.2 mm to 2.8 mm. Ground line 305 may have a width $w_{gl}$ (FIG. 4C) and may extend a circuitous length $L_{gl}$ from ground connection 215 to a lower end of arm support beam 300 at a point where feed line 310 and cantilever beam 225 also may connect to arm support beam 300. Width $w_{gl}$ may range from 1.7 mm to 2.3 mm and length $L_{gl}$ may range from 35.2 mm to 35.8 mm. In one exemplary implementation, gap G may be 2.5 mm, width $w_{gl}$ may be 2.0 mm, and length $L_{gl}$ may be 35.5 mm.

Impedance matching element 315 may be formed in the sheet metal 110 at an angle $\Theta_6$ (FIG. 4C) relative to a planar surface of cantilever beam 225. Angle $\Theta_6$ may range from about 89 degrees to about 91 degrees. In the implementation depicted in FIGS. 4A-4C, angle $\Theta_6$ may be 90 degrees. Impedance matching element 315 may include a roughly rectangular tab shape (FIG. 4B) that extends downwards from a lower surface of cantilever beam 225 at the angle $\Theta_6$. Impedance matching element 315 has a length Lim (FIG. 4B) that may range from 4.5 mm to 5.1 mm, and a width $W_{im}$ (FIG. 4B) that may range from 6.8 mm to 7.4 mm. Impedance matching element 315, thus, may “fold” downwards from an outer edge of cantilever beam 225 to more easily allow dipole antenna structure 100, including cantilevered structure 210, to fit within spatial constraints of the device housing in which dipole antenna structure 100 is to be placed.

Figure 5:
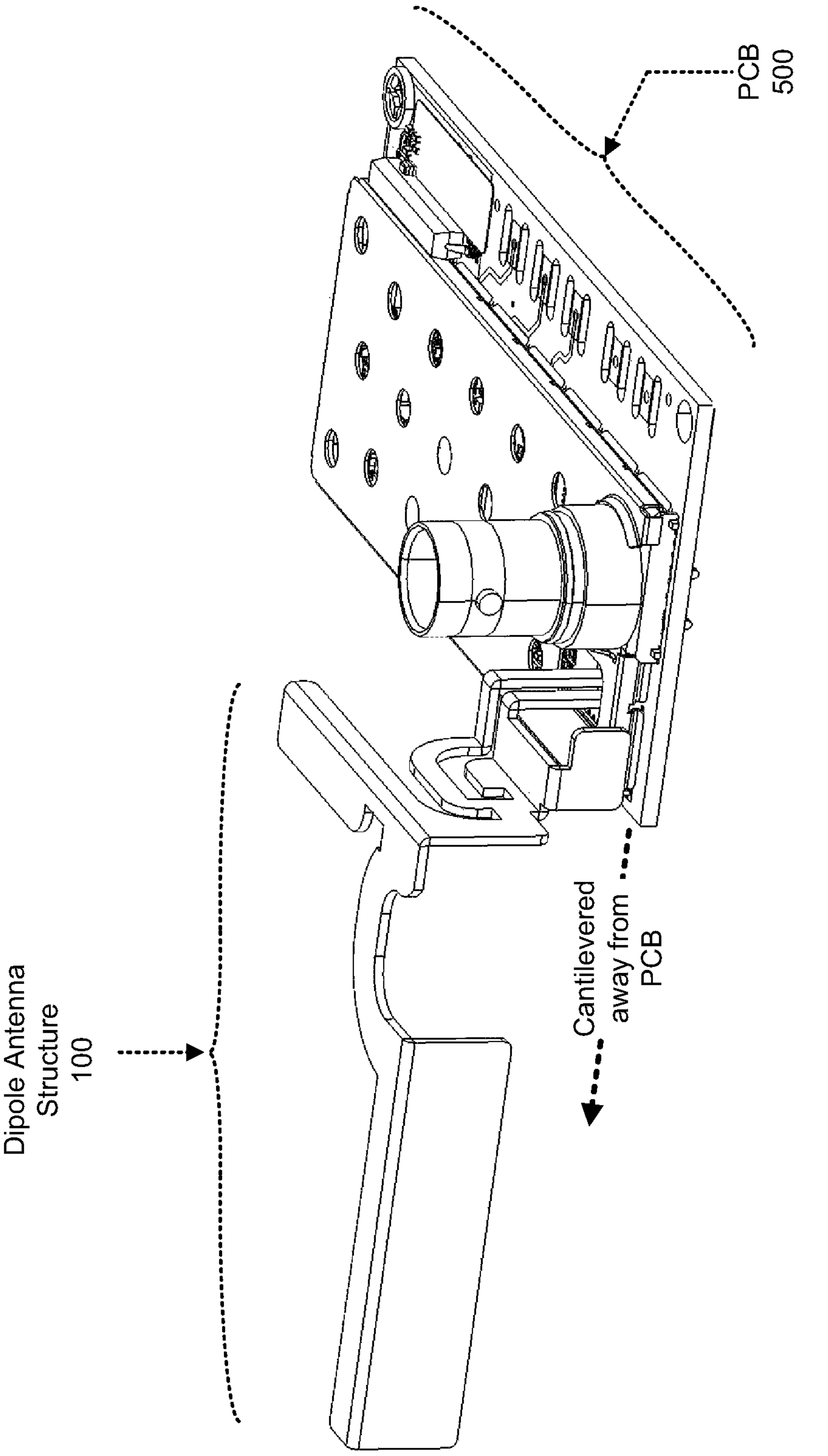
FIG. 5 illustrates interconnection of the dipole antenna structure with a Printed Circuit Board (PCB)

FIG. 5 illustrates interconnection of dipole antenna structure 100 with a PCB 500 that, among other components that possibly include additional antenna elements, includes circuitry for supplying signals to, and/or receiving signals from, dipole antenna structure 100. As shown, dipole antenna structure 100 may connect to PCB 500 near an edge of PCB 500 such that, due to the cantilevered beam structure of dipole antenna structure 100, the dipole arms 200 and 205 of the antenna structure 100 are cantilevered out and away from the underlying PCB 500.

Figure 6:
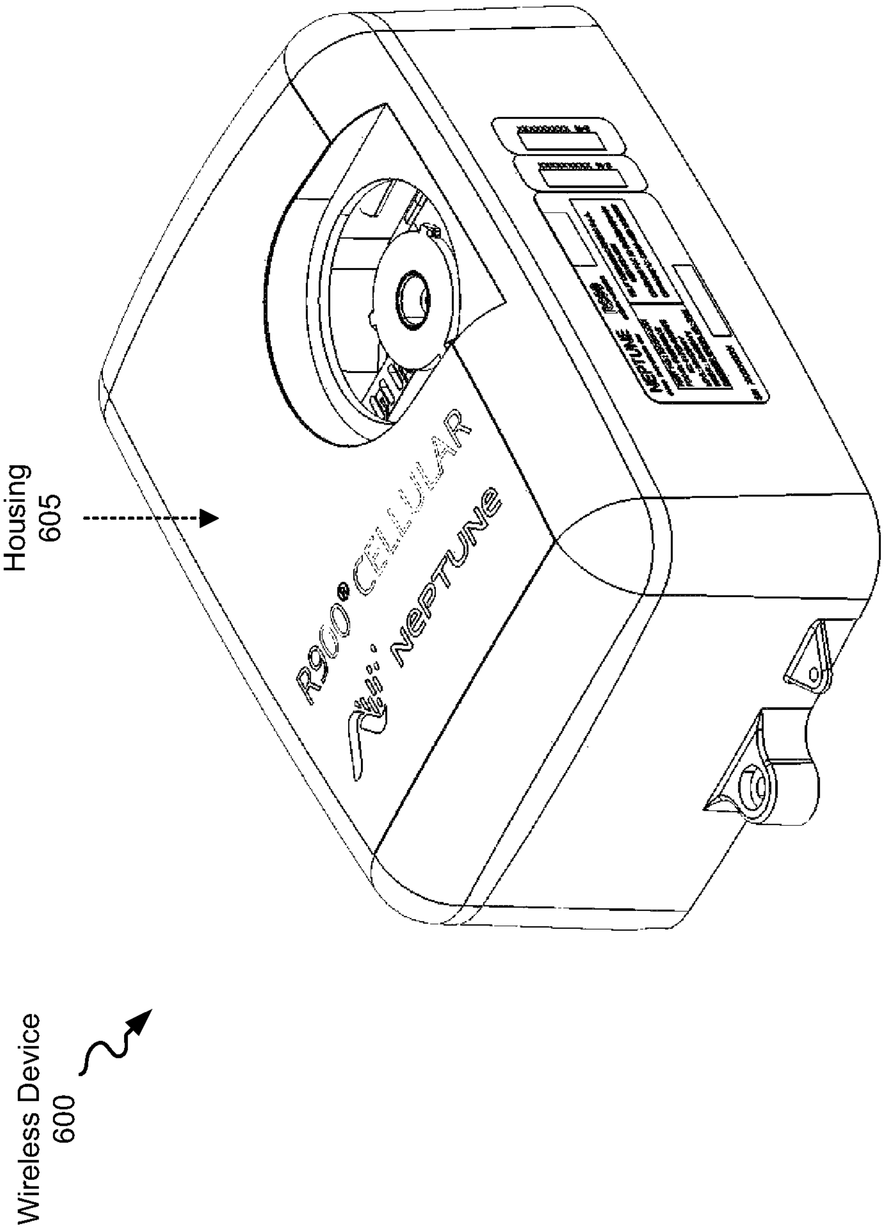
FIG. 6 shows a wireless device that includes a device housing inside of which the dipole antenna structure and the PCB may be placed.
Figure 7:
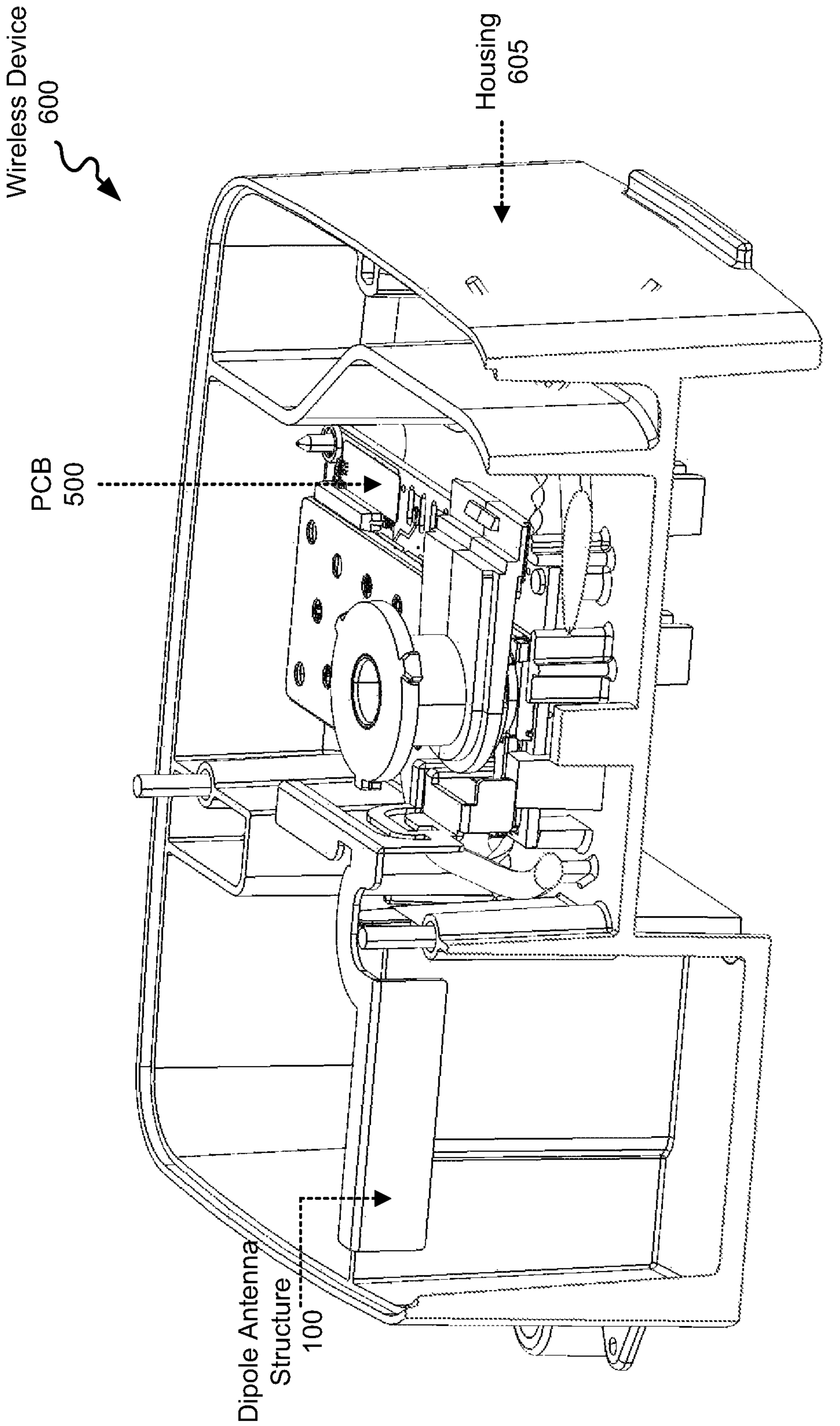
FIG. 7 further depicts a cutaway view of the internal space of the wireless device of FIG. 6, with one example of an internal arrangement of the dipole antenna structure, the PCB, and other components.

FIG. 6 shows a wireless device 600 that includes a device housing 605, inside of which the dipole antenna structure 100 and the PCB 500 may be placed. The shape and dimensions of housing 605 may vary based on the internal disposition and arrangement of dipole antenna structure 100, PCB 500, and other components of the device 600. FIG. 7 further depicts a cutaway view of the internal space of the housing 605 of wireless device 600, with one example of an internal arrangement of dipole antenna structure 100, PCB 500, and other components. As shown in the example of FIG. 7, PCB 500 may be located within housing 605 such that dipole antenna structure 100, with its cantilevered beam structure, extends out and away from PCB 500 but still remains within the confines of the interior of housing 605.

Figure 8:
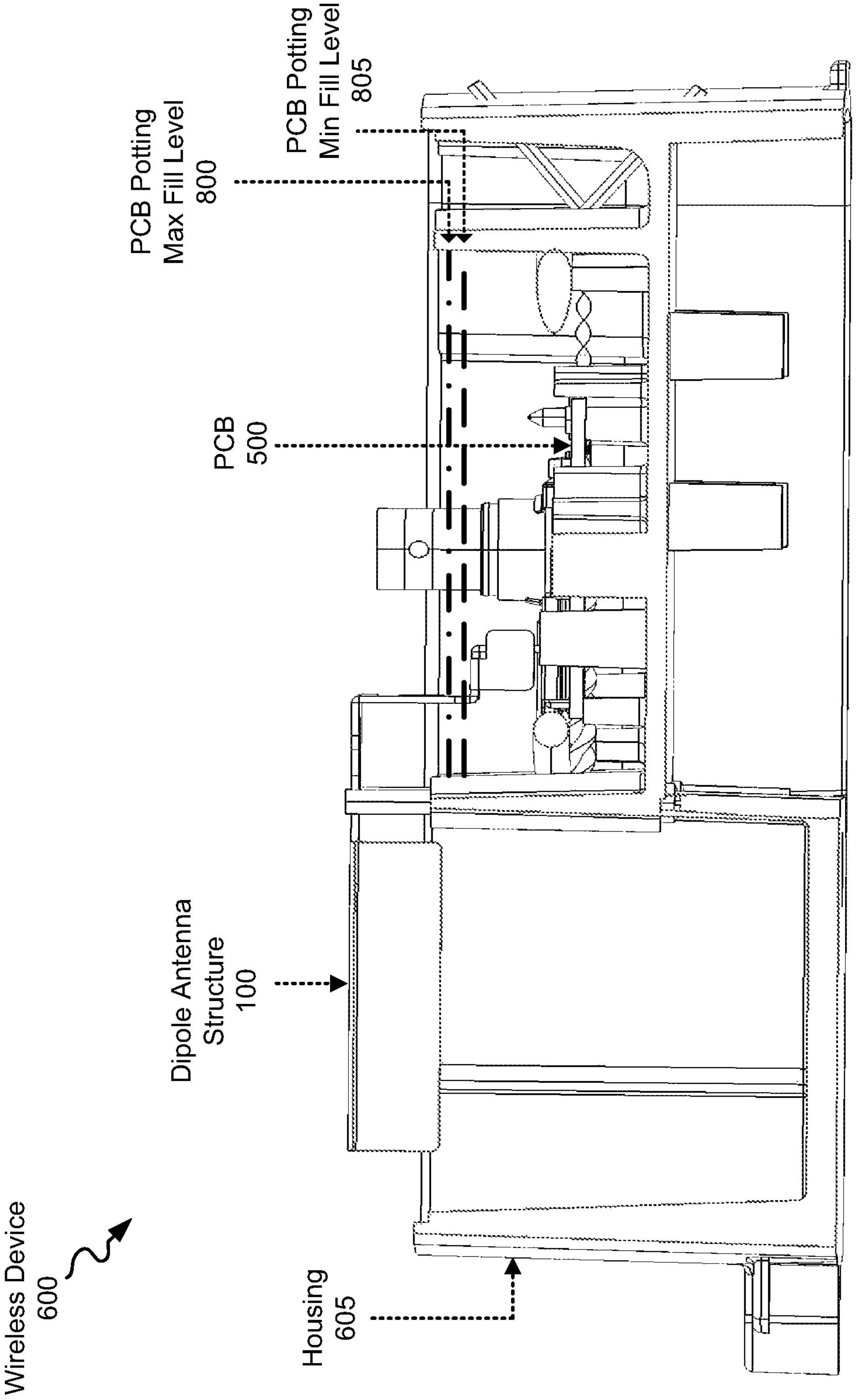
FIG. 8 illustrates an example of the use of PCB potting to protect the PCB, and other components of the wireless device of FIG. 6, in addition to providing mechanical support for the dipole antenna structure.

FIG. 8 illustrates an example of the use of PCB potting to protect PCB 500, and other components of wireless device 600, in addition to providing mechanical support for dipole antenna structure 100. PCB potting involves filling the housing 605 in, and around, PCB 500 and dipole antenna structure 100 with a liquid potting compound (e.g., epoxy, resin, polyurethane, silicone) that covers or submerges, or partially covers/submerges, PCB 500 and a portion of dipole antenna structure 100 and then dries and hardens to protect PCB 500. A layer of PCB potting compound applied within the interior of device 600 provides a level of resistance to heat, chemicals, impacts, and other environmental hazards. PCB potting, in the example of FIG. 8, additionally provides mechanical support to the dipole antenna structure 100 in its arrangement of being connected to, and cantilevered away from, PCB 500. The PCB potting compound may be filled to a particular fill level within housing 605. For example, given that the PCB may operate as part of the overall antenna, the PCB potting fill level within housing 605 may be set such that the effect of the PCB potting upon the frequency response of dipole antenna structure 100 may be minimized, in conjunction with the effect of impedance matching element 315. FIG. 8 depicts a PCB potting maximum fill level 800 and a PCB potting minimum fill level 805. The PCB potting compound may be poured into housing 605 and filled no higher than the PCB potting maximum fill level 800 so as to attempt to minimize the PCB potting's impact on the dipole antenna structure 100's frequency response. When pouring the PCB potting compound into housing 605, the PCB potting compound may be filled to at least the PCB potting minimum fill level 805 to ensure adequate protection for the covered/submerged PCB 500, and other components, and to provide sufficient mechanical support for the cantilevered structure 210 of antenna structure 100 which supports the dipole arms 200 and 205 of antenna structure 100. The PCB potting's impact upon the frequency response of dipole antenna structure 100 may be minimized if the fill level of the PCB potting compound is kept within the PCB potting maximum fill level 800 and the minimum fill level 805 shown in FIG. 8. The particular maximum and minimum fill levels for the PCB potting within housing 605 may vary based on a number of different factors, such as the particular physical arrangement of PCB 500 and dipole antenna structure 100, and the multi-band frequencies for which the dipole antenna structure 100 is designed.

Figure 9A:
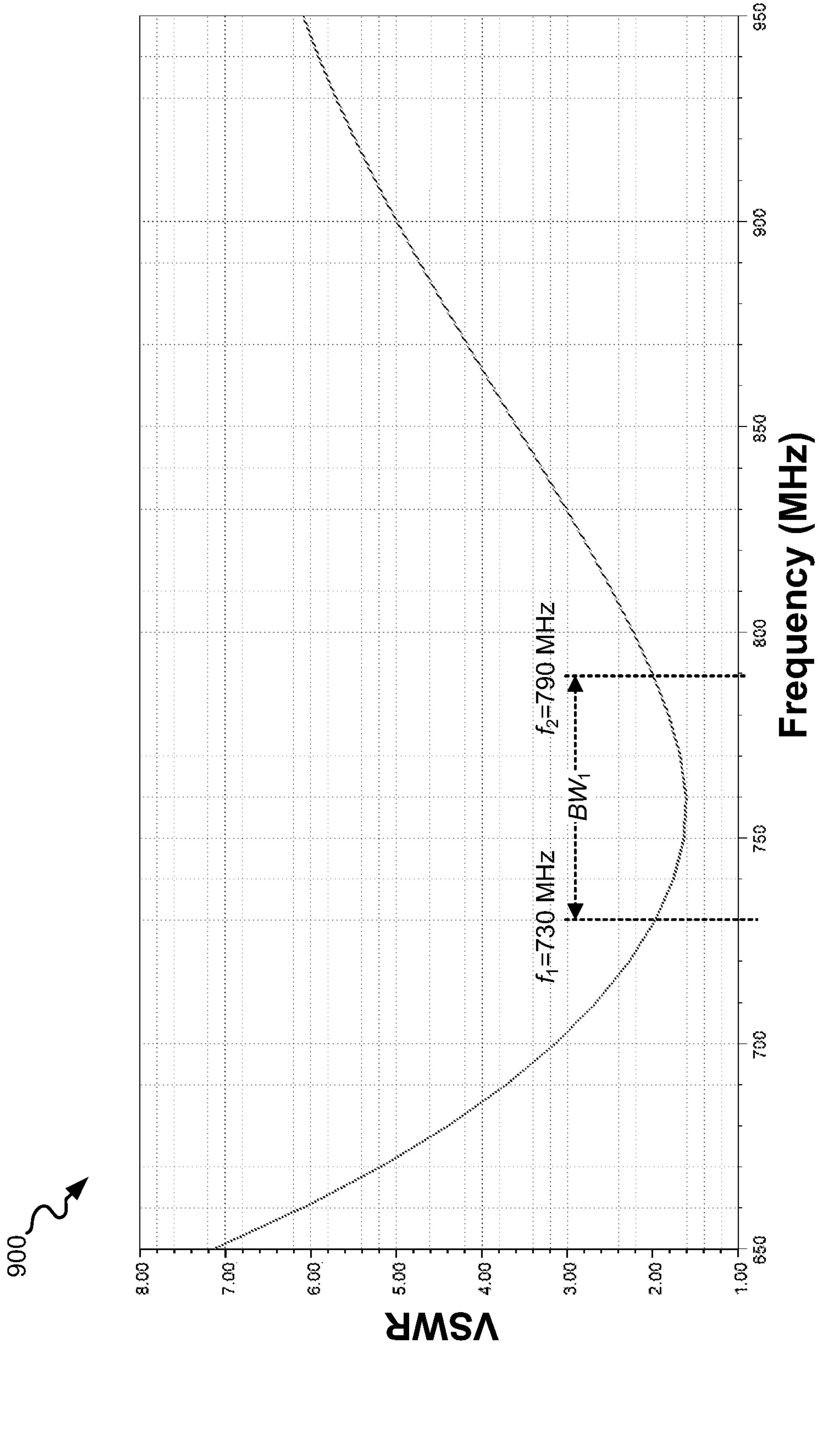
FIGS. 9A and 9B depict plots of Voltage Standing Wave Ratio versus frequency for an exemplary implementation of the dipole antenna structure.
Figure 9B:
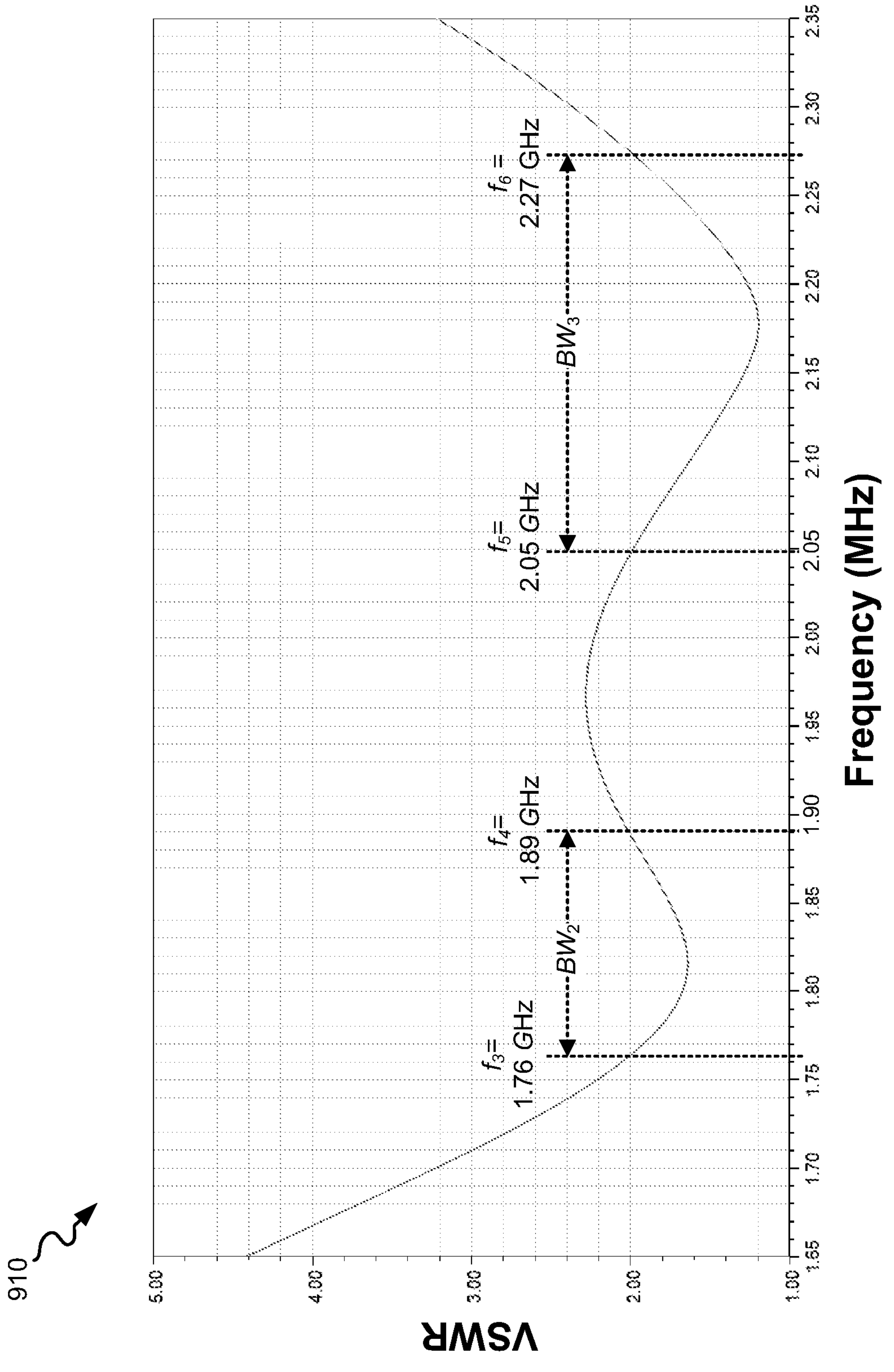

FIGS. 9A and 9B depict plots 900 and 910 of Voltage Standing Wave Ratio (VSWR) versus frequency for an exemplary implementation of the dipole antenna structure 100 described herein. The x-axis of the plots of FIGS. 9A and 9B includes frequency, ranging from 650 MegaHertz (MHz) to 950 MHz in FIG. 9A and ranging from 1.65 GigaHertz (GHz) to 2.35 GHz in FIG. 9B. The y-axis of the plots includes VSWR ranging from 1.00 to 8.00 in FIG. 9A and ranging from 1.00 to 5.00 in FIG. 9B. As is understood in the art, for a transmitter to deliver power to an antenna, or receive power from the antenna, the impedance of the transmitter/receiver and the transmission line must be well matched to the antenna's impedance. The VSWR parameter of an antenna numerically measures how well the antenna is impedance matched to the transmitter/receiver. The smaller an antenna's VSWR is, the better the antenna is matched to the transmitter/receiver and the transmission line, and the more power is delivered to/from the antenna. The minimum VSWR of an antenna is 1.0, at which no power is reflected from the antenna. Bandwidth requirements of antennas are typically expressed in terms of VSWR and a commonly adopted bandwidth specification is a 2:1 VSWR, meaning that the antenna has a range of frequencies (i.e., the impedance bandwidth) over which the antenna VSWR is less than or equal to two. For example, an antenna for a particular application may need to operate from 1.0 GHz to 1.3 GHz with a VSWR less than or equal to 2.0. In this example, the impedance bandwidth of the antenna would be 1.0 GHz to 1.3 GHz.

Plot 900 of FIG. 9A depicts a lower frequency band of an exemplary implementation of dipole antenna structure 100. In the plot 900, the lower frequency band ($BW_1$) at which the plotted VSWR is less than or equal to two spans a frequency range of $f_1$ equals 730 MHz to $f_2$ equals 790 MHz. In the plot 910 of FIG. 9B, there are two higher frequency bands at which the VSWR is less than or equal to two. The second, higher frequency band ($BW_2$) spans a frequency range of $f_3$ equals 1.76 GHz to $f_4$ equals 1.89 GHz and the third, higher frequency band ($BW_3$) spans a frequency range offs equals 2.05 GHz to $f_6$ equals 2.27 GHz. The dipole antenna structure 100's impedance is, therefore, in the exemplary implementation, well matched to the transmitter/receiver and the transmission line within the three frequency bands shown in FIGS. 9A and 9B. One skilled in the art will recognize, however, that the frequency bands depicted in FIGS. 9A and 9B may be changed based on changing dimensions of components of dipole antenna structure 100, such as, for example, changing the length $L_{alh}$ of first dipole arm 200, changing the length $L_{a2}$ of second dipole arm 205, and/or changing various dimensions of the components of the cantilevered structure 210 (e.g., ground line 305, feed line 310, impedance matching element 315, cantilever beam 225, arm support beam 300).

The foregoing description of implementations provides illustration and description, but is not intended to be exhaustive or to limit the invention to the precise form disclosed. Modifications and variations are possible in light of the above teachings or may be acquired from practice of the invention. For example, various components of a sheet metal antenna structure, having particular dimensions, relative positions and angles, and interconnections, have been shown and described. It should be understood that different dimensions, relative positions and angles, and interconnections of the antenna structure may be used than those described herein. Various dimensions associated with, for example, the length and/or width of antenna components formed in the sheet metal 110 have been provided herein. It should be understood that different dimensions of the various antenna components formed in the sheet metal 110, such as different lengths, widths, thicknesses, angles, etc., may be used than those described herein. The resonant frequencies, and antenna impedance, of dipole antenna structure 100 may be adjusted based on varying the relative lengths, widths, angles, and/or thicknesses of the sheet metal antenna components described herein.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A dipole antenna structure, comprising:

a sheet of metal that forms elements of a dipole antenna comprising:

a first dipole arm tuned to a first frequency band;

a second dipole arm, tuned to a second frequency band, connected directly to the first dipole arm and formed substantially co-planar with, and at a first angle to, the first dipole arm; and at least one impedance matching element coupled to the second dipole arm, wherein the at least one impedance matching element is formed in the sheet of metal at a second angle relative to a plane that coincides with the substantially co-planar first and second dipole arms, wherein a portion of the sheet metal that forms the at least one impedance matching element also forms a cantilevered structure that connects to the second dipole arm such that the first dipole arm and the second dipole arm are cantilevered away from a printed circuit board mounting point of the dipole antenna structure.

2. The dipole antenna structure of claim 1, wherein the second angle comprises a right angle.

3. The dipole antenna structure of claim 1, wherein the cantilevered structure comprises an arm support beam having a first end and a second end, wherein the first end is connected to an underside of the second dipole arm and wherein the second end is connected to a cantilever beam that is formed in the metal structure at a third angle to the arm support beam.

4. The dipole antenna structure of claim 1, wherein the sheet of metal further comprises:

a ground connection connected to the at least one impedance matching element; and a feed connection connected to the at least one impedance matching element.

5. The dipole antenna structure of claim 4, wherein at least one impedance matching element is formed in the portion of the sheet of metal between the ground connection and the feed connection.

6. The dipole antenna structure of claim 1, wherein the first angle comprises a right angle.

7. The dipole antenna structure of claim 1, wherein the first dipole arm has a first length and a first shape that resonates at the first antenna frequency band.

8. The dipole antenna structure of claim 7, wherein the second dipole arm has a second length and a second shape that resonates at the second antenna frequency band.

9. An antenna, comprising:

a metal structure formed to produce:

a first arm formed as a first planar member of the metal structure to resonate at a first frequency band;

a second arm formed as a second planar member of the metal structure to resonate at a second frequency band, wherein the second arm is co-planar with, connected directly to, and formed at a first angle to, the first arm; and a cantilevered structure, formed in the metal structure at a second angle relative to the co-planar first arm and second arm, that connects to the second arm and cantilevers the first arm and the second arm outwards away from an edge of a printed circuit board to which the antenna connects, wherein the cantilevered structure comprises at least one of an antenna impedance matching element, a feed connection, or a ground connection of the antenna.

10. The antenna of claim 9, wherein the first arm has a first length and a first shape that resonates at the first frequency band.

11. The antenna of claim 9, wherein the second arm has a second length and a second shape that resonates at the second frequency band.

12. The antenna of claim 9, wherein the cantilevered structure comprises an arm support beam having a first end and a second end, wherein the first end is connected to an underside of the first arm and the second arm and wherein the second end is connected to a cantilever beam that is formed in the metal structure at a third angle to the arm support beam.

13. The antenna of claim 9, wherein the antenna impedance matching element comprises an impedance matching element, a ground line having a first length, and a feed line having a second length.

14. The antenna of claim 9, wherein the first angle is approximately 90 degrees and the second angle is approximately 90 degrees.

15. The antenna of claim 9, wherein the antenna comprises a dipole antenna, the first arm comprises a first dipole arm, and the second arm comprises a second dipole arm.

16. A multi-band dipole antenna, comprising:

a metal structure that forms elements of the dipole antenna comprising:

a first dipole arm formed in the metal structure and tuned to a first frequency band;

a second dipole arm formed in the metal structure and tuned to a second frequency band, wherein the second dipole arm is formed co-planar with, and non-parallel to, the first dipole arm; and a cantilevered structure, formed in the metal structure adjacent the first and second dipole arms, wherein the cantilevered structure further comprises:

an arm support beam formed in the metal structure at a first angle relative to a bottom surface of the second dipole arm, a cantilever beam formed in the metal structure at a second angle relative to a surface of the arm support beam, a feed line formed in the metal structure to connect to the cantilever beam, and a ground line formed in the metal structure to connect to the arm support beam.

17. The multi-band dipole antenna of claim 16, wherein the arm support beam has a first end and a second end, wherein the first end connects to the second dipole arm and the second end connects to the cantilever beam.

18. The multi-band dipole antenna of claim 16, wherein the cantilever beam has a first end and a second end, wherein the first end connects to the arm support beam and the second end connects to the feed line.

19. The multi-band dipole antenna of claim 16, wherein the second dipole arm is formed at a third angle relative to the first dipole arm, and wherein the third angle is a right angle.

20. The multi-band dipole antenna of claim 16, wherein the first angle comprises a right angle and wherein the second angle comprises a right angle.

* * * * *